United States Patent
Nesbitt, III

(10) Patent No.: US 8,939,458 B2
(45) Date of Patent: Jan. 27, 2015

(54) SUSPENSION SYSTEM

(71) Applicant: American Design and Master-Craft Initiative, LLC, Chicago, IL (US)

(72) Inventor: James Thomas Nesbitt, III, New Orleans, LA (US)

(73) Assignee: American Design and Master-Craft Initiative, LLC, Chicago, IL (US)

( * ) Notice: Subject to any disclaimer, the term of this patent is extended or adjusted under 35 U.S.C. 154(b) by 12 days.

(21) Appl. No.: 13/915,736

(22) Filed: Jun. 12, 2013

(65) Prior Publication Data

US 2014/0367942 A1 Dec. 18, 2014

(51) Int. Cl.
*B62K 25/24* (2006.01)

(52) U.S. Cl.
CPC ....................................... *B62K 25/24* (2013.01)
USPC ........................................................ 280/276

(58) Field of Classification Search
CPC ..................................................... B62K 25/24
USPC .................... 180/227; 280/283, 284, 275, 276
See application file for complete search history.

(56) References Cited

U.S. PATENT DOCUMENTS

| | | |
|---|---|---|
| 339,446 A | 4/1886 | Martin |
| 434,234 A | 8/1890 | Barker |
| 591,306 A | 10/1897 | Tolson |
| 687,216 A | 11/1901 | Foreman |
| 1,977,317 A | 10/1934 | Maypole |
| 2,187,238 A | 1/1940 | Judd |
| 2,194,103 A | 3/1940 | Tibbals |
| 3,948,543 A | 4/1976 | MacDonald et al. |
| 4,278,266 A | 7/1981 | Inoue et al. |
| 4,566,713 A | 1/1986 | Hon |
| 4,669,747 A | 6/1987 | Groendal |
| 4,732,404 A | 3/1988 | Coetzee |
| 4,838,569 A | 6/1989 | Ford |
| 5,498,013 A | 3/1996 | Hwang |
| 5,749,590 A | 5/1998 | Roerig |
| 5,833,258 A | 11/1998 | Maestripieri |
| 5,853,651 A | 12/1998 | Lindsay et al. |
| 7,546,894 B1 | 6/2009 | Glenn |
| 2004/0169353 A1 | 9/2004 | Kinzel |

(Continued)

FOREIGN PATENT DOCUMENTS

| | | |
|---|---|---|
| DE | 325034 | 9/1920 |
| GB | 139299 | 3/1920 |

OTHER PUBLICATIONS

1920 Indian Daytona Motorcycle, available as of Jun. 11, 2013 at http://www.caimag.com/wordpress/2010/06/03/steve-mcqueen-1920-indian-daytona-motorcycle-racer/.

(Continued)

*Primary Examiner* — Joseph M Rocca
*Assistant Examiner* — Gabriela C Craciun
(74) *Attorney, Agent, or Firm* — Beem Patent Law Firm

(57) ABSTRACT

A vehicle suspension system includes a spring, a neck assembly, and a rod. The neck assembly has an outer shell housing a hollow stem having an upper end and a lower end. The stem is rotatable respect to outer shell. The upper end is coupled to an upper bracket having a control arm pivotally coupled thereto. The lower end is coupled to a lower bracket having a linkage pivotally connected thereto. The rod has a first end coupled to the spring and a second end coupled to the linkage. The rod extends through the hollow stem. The linkage is further coupled to a wheel assembly.

17 Claims, 7 Drawing Sheets

(56) References Cited

U.S. PATENT DOCUMENTS

2006/0138743 A1 6/2006 Beal
2013/0026729 A1 1/2013 King et al.

OTHER PUBLICATIONS

Indian 841 Motorcycle, available as of Jun. 11, 2013 at http://indianmcc.com/841.html.
Confederate Wraith Motorcycle, available as of Jun. 11, 2013 at http://confederate.com/r135.
1915 Iver Johnson Motorcycle, available as of Jun. 11, 2013 at http://www.motorcycleclassics.com/barbers-best/1915-iver-johnson.aspx.
Notification of Transmittal of the International Search Report and The Written Opinion of the International Searching Authority, or the Declaration, dated Dec. 3, 2014, issued in International Application No. PCT/US14/41697 (13 pages).

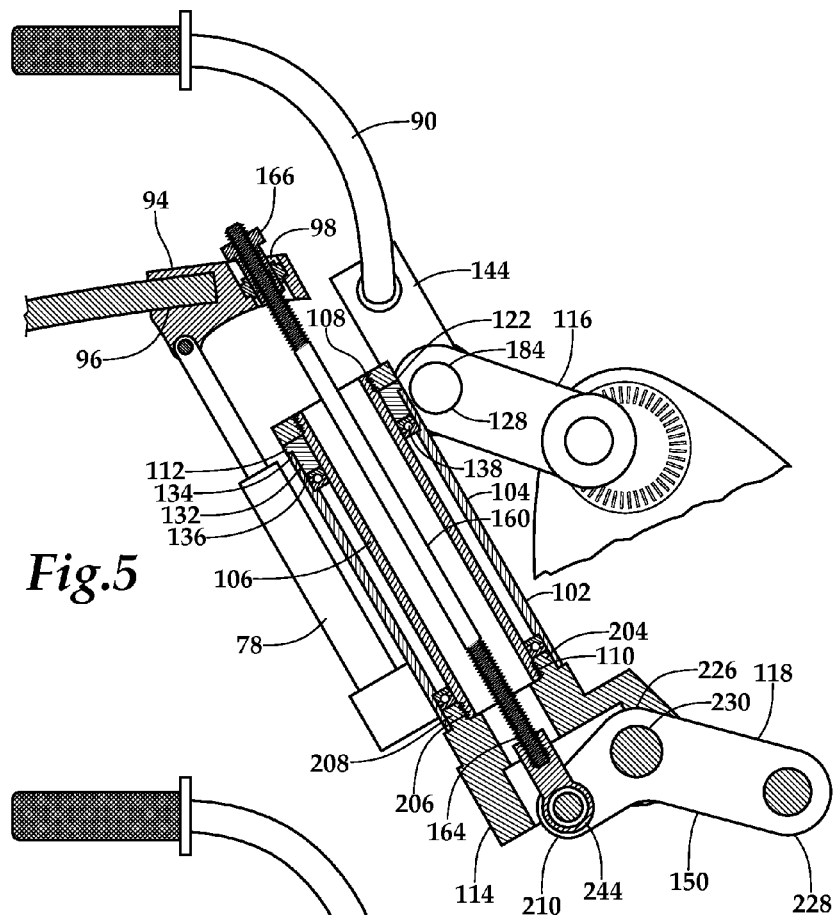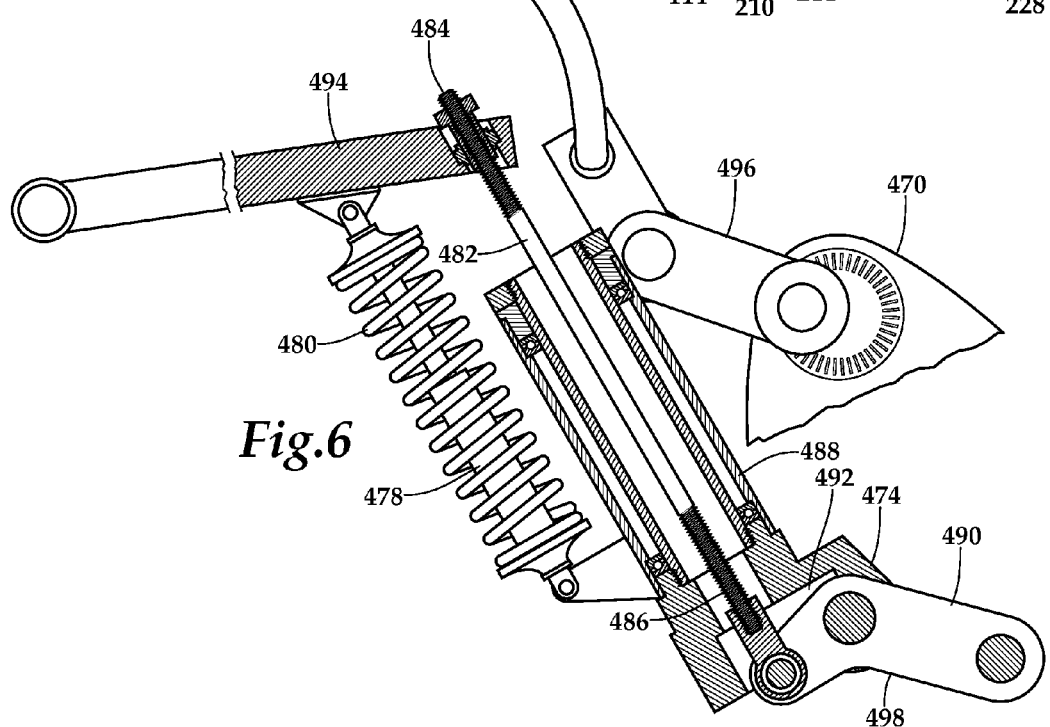

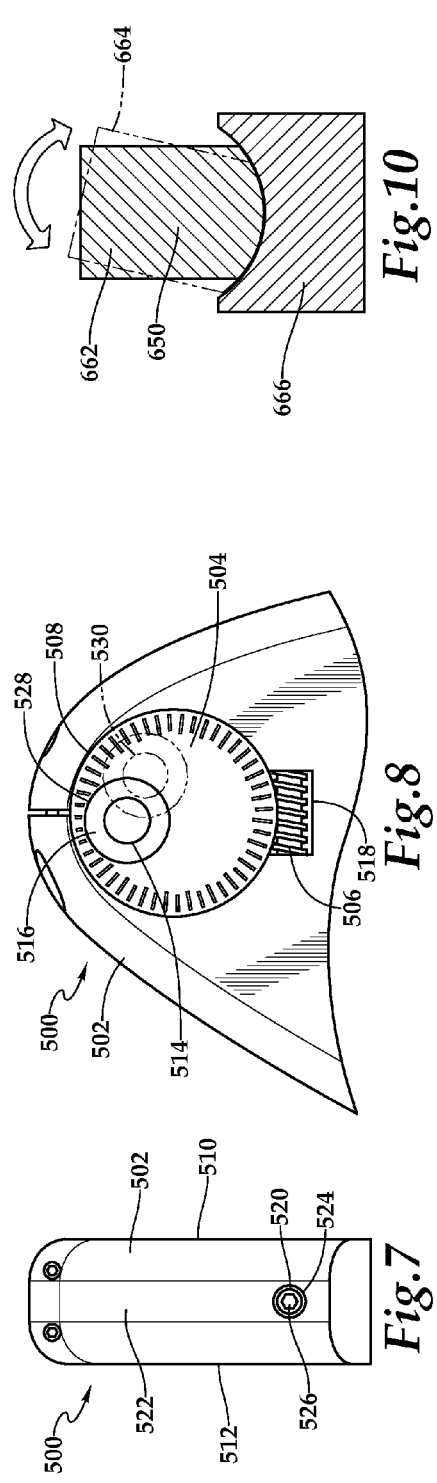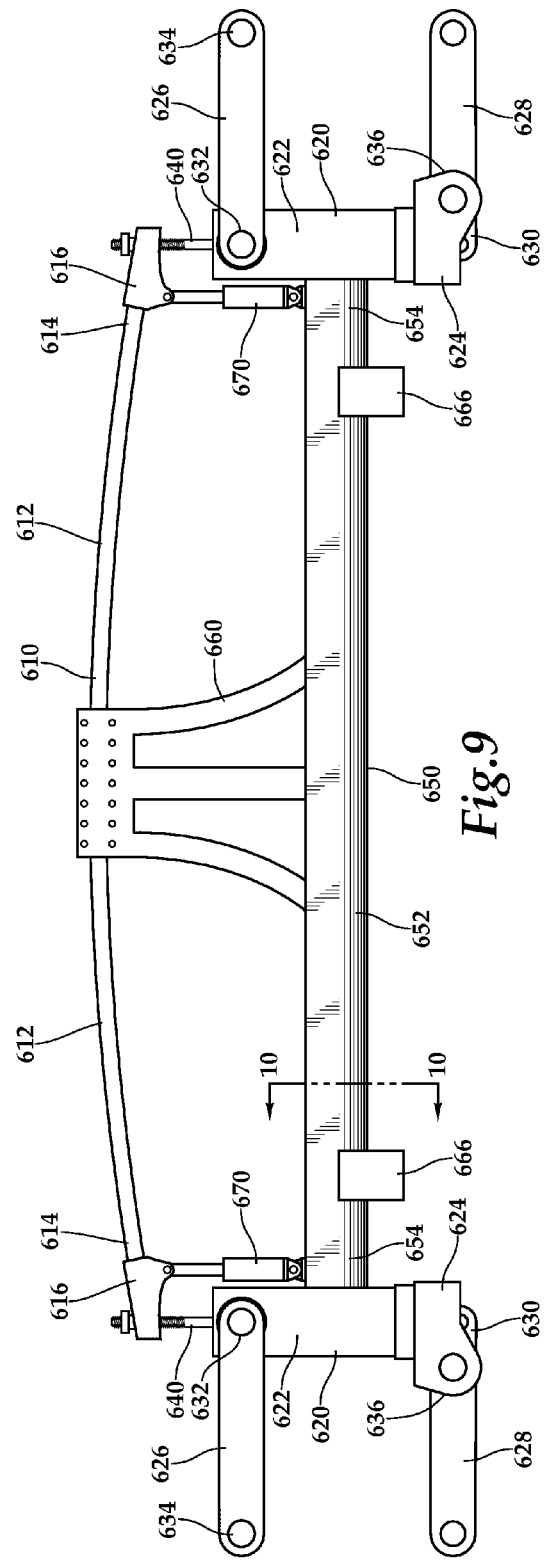

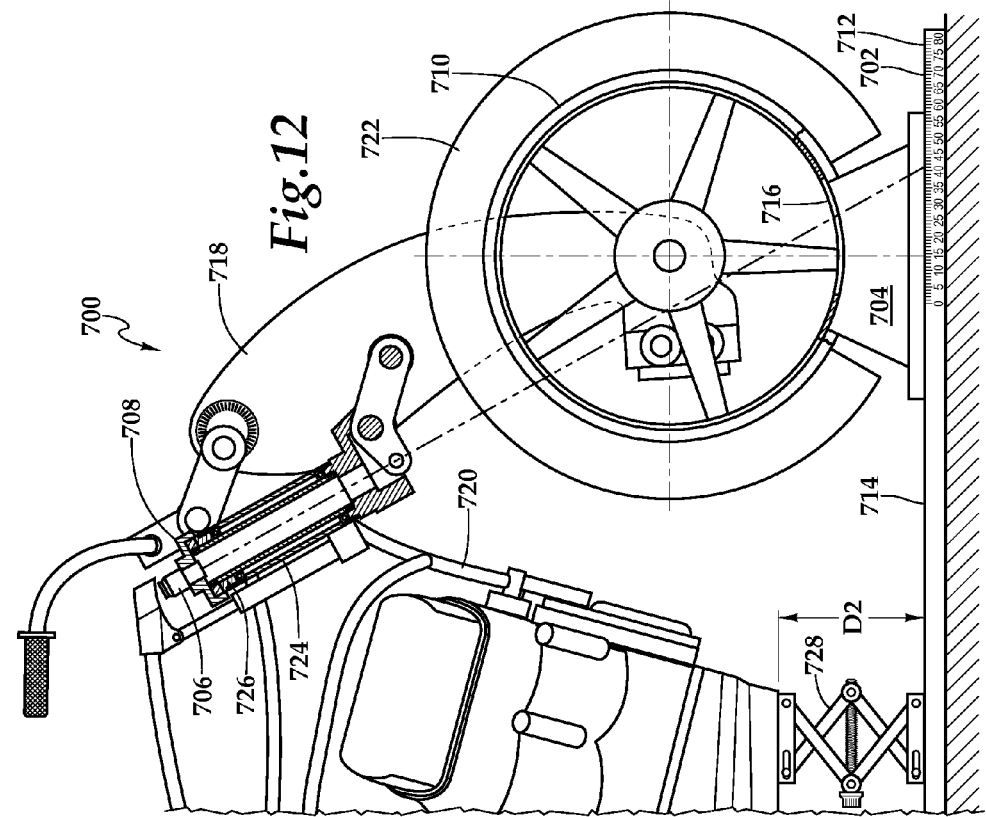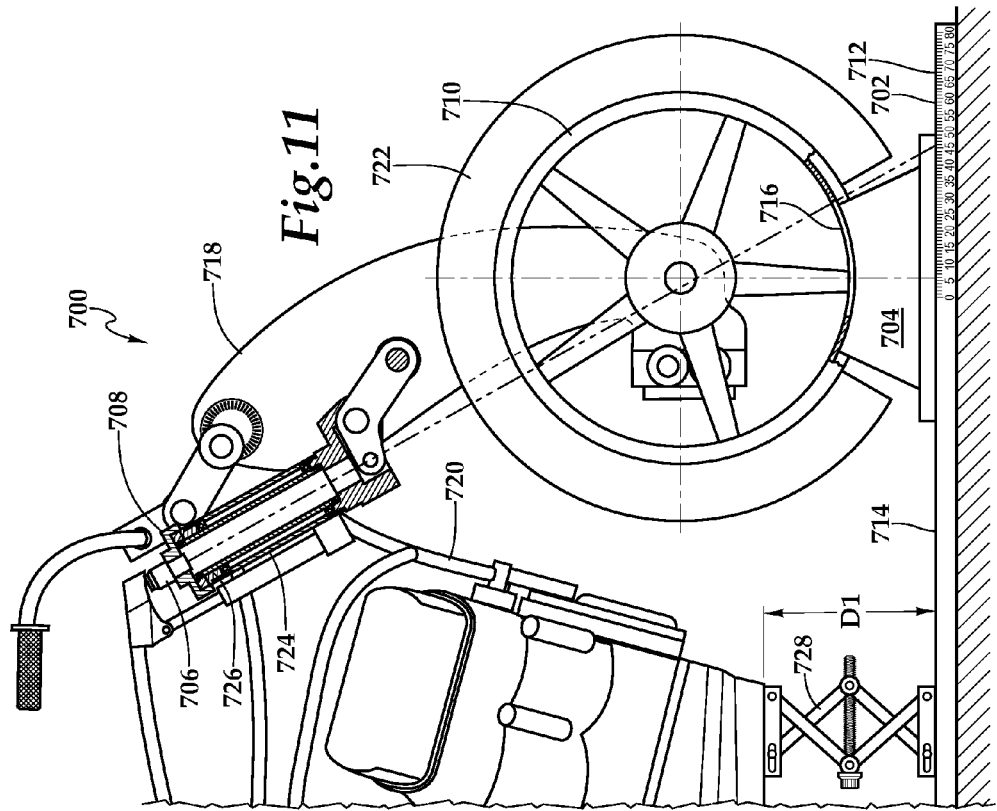

SUSPENSION SYSTEM

BACKGROUND OF THE INVENTION

The invention relates generally to vehicle suspension systems, and more particularly to a multi-link suspension system.

Vehicle suspensions, specifically motorcycle and bicycle suspensions, are used to absorb bumps, cracks, and roadway deformities to provide a rider with a smoother ride and allow the rider to maintain control of the vehicle. A girder fork or girder front end is a common front end suspension in motorcycles. A traditional girder fork has a pair of uprights that is connected to a front wheel axle on one end and two links on the other end. A spring, most commonly a coil spring, connects the lower link to an upper link having a set of handle bars mounted thereon. Leaf springs have also been used as the spring in front suspensions. The leaf spring is mounted to a bracket extending above the front wheel and connects the girder forks or leading or trailing links to the front wheel.

In both of these suspensions, steering and suspension are coupled together, meaning when a rider rotates the handle bars to turn the front wheel and ultimately steer the bike, the spring mounted to the girder front end simultaneously moves with all of the components of the girder front end. In addition, the weight of the spring adds to the unsprung weight or weight not supported by the suspension of the bike. Generally, a greater amount of unsprung weight produces a poor ride quality and potential wheel control issues when accelerating or braking.

SUMMARY OF THE INVENTION

In one aspect, a vehicle suspension system may comprise a spring, a neck assembly, and a rod. The neck assembly has an outer shell housing a hollow stem having an upper end and a lower end with the stem being rotatable with respect to the outer shell. The upper end is coupled to an upper bracket having a control arm pivotally coupled thereto, and the lower end is coupled to a lower bracket having a linkage pivotally connected thereto. The rod has a first end coupled to the spring and a second end coupled to the linkage. The rod extends through the hollow stem. The linkage is further coupled to a wheel assembly.

In one embodiment, the spring may be a leaf spring, and in another embodiment the spring may be a coil spring. An end piece may be coupled to the spring, wherein the first end of the rod couples to the end piece.

In one embodiment, the wheel assembly may comprise two girder blades coupled to an axle having a wheel rotatably mounted therebetween. The girder blades may be reinforced fiberglass composite material and have an eccentric assembly coupled to the control arm and a middle point coupled to the linkage.

In another embodiment a vehicle suspension system may further comprise a rear linkage having a first connection point, a second connection point, and a third connection point, a second rod having a top end and a bottom end, and a ride height adjust eccentric. The third connection point may be pivotally coupled to a rear wheel assembly. The top end of the second rod may be coupled to the leaf spring and the bottom end may be coupled to the first point. The ride height adjust eccentric may be connected to the second point by a ride height arm.

In another embodiment, a vehicle suspension system may further comprise an axle having a first end, a second end, and a body portion therebetween, a second neck assembly having a hollow stem and second linkage, and a second rod having a first and a second end. The neck assembly may be coupled to the first end and the second neck assembly may couple to the second end, and a mount may connect the leaf spring to the body portion. The second rod may extend through the hollow stem of the second neck assembly. The first end of the second rod may couple to the leaf spring and the second end of said second rod may couple to the second linkage.

In another embodiment, the suspension system may further include a damper mounted on the neck assembly, with the damper connecting to the spring.

In another aspect, an apparatus for a suspension system may include a hollow shell, a hollow stem having an upper end and a lower end, an upper control arm having a first end and a second end, and a linkage having a lower control arm and a flange. The shell houses the stem and the upper end may be coupled to an upper bracket. The lower end may be coupled to a lower bracket. The stem, the upper bracket, and the lower bracket are rotatable with respect to the shell. The first end may be pivotally connected to the upper bracket and the second end may be pivotally connected to a first front fork member and a second front fork member. The linkage may be pivotally connected to the lower bracket, the lower control arm may be pivotally connected to the first front fork member and the second front fork member, and the flange may be coupled to a rod that that extends through the hollow stem and couples to a member.

In another embodiment, the upper control arm may comprise two upper linkages with one upper linkage being pivotally attached on each side of the upper bracket. The upper bracket may be configured for attaching a pair of handlebars. The suspension system may include a taper roller bearing between the shell and the stem.

In another aspect, an apparatus for determining and setting a trail value of a two-wheeled vehicle may comprise a measuring surface, two carriers slidably mounted to the measuring surface, two modified hubs with one hub coupled to each of the carriers, and a laser pointer carrier having a laser pointer mounted therein. The two-wheeled vehicle has a hollow neck and is mounted to the modified hubs. The laser pointer carrier is affixed in the hollow neck with the laser directed towards the measuring surface.

In another embodiment, an apparatus for determining and setting a trail value of a two-wheeled vehicle may further comprise a lift for simulating suspension travel.

These and other features and advantages are evident from the following description of the present invention, with reference to the accompanying drawings.

DESCRIPTION OF THE DRAWINGS

FIG. 5 is a sectional view of the steering neck with incorporated suspension components along lines 5-5 of FIG. 3;

FIG. 6 is a sectional view of the steering neck with incorporated suspension components along lines 5-5 of FIG. 3 showing an alternate embodiment of the steering neck;

FIG. 7 is a front view of an eccentric assembly of the suspension adjustment system;

FIG. 8 is a side view of the eccentric assembly of the suspension adjustment system;

FIG. 9 is front view of an alternate embodiment of the suspension system for use in an automobile or other four-wheeled vehicle;

FIG. 10 is a sectional view of the suspension system along lines 10-10 of FIG. 9;

FIG. 11 is a side view of the trail value calculator tool showing the suspension system displaced at a first position;

FIG. 12 is a side view of the trail value calculator tool showing the suspension system displaced at a first position.

DETAILED DESCRIPTION

Figure 1:
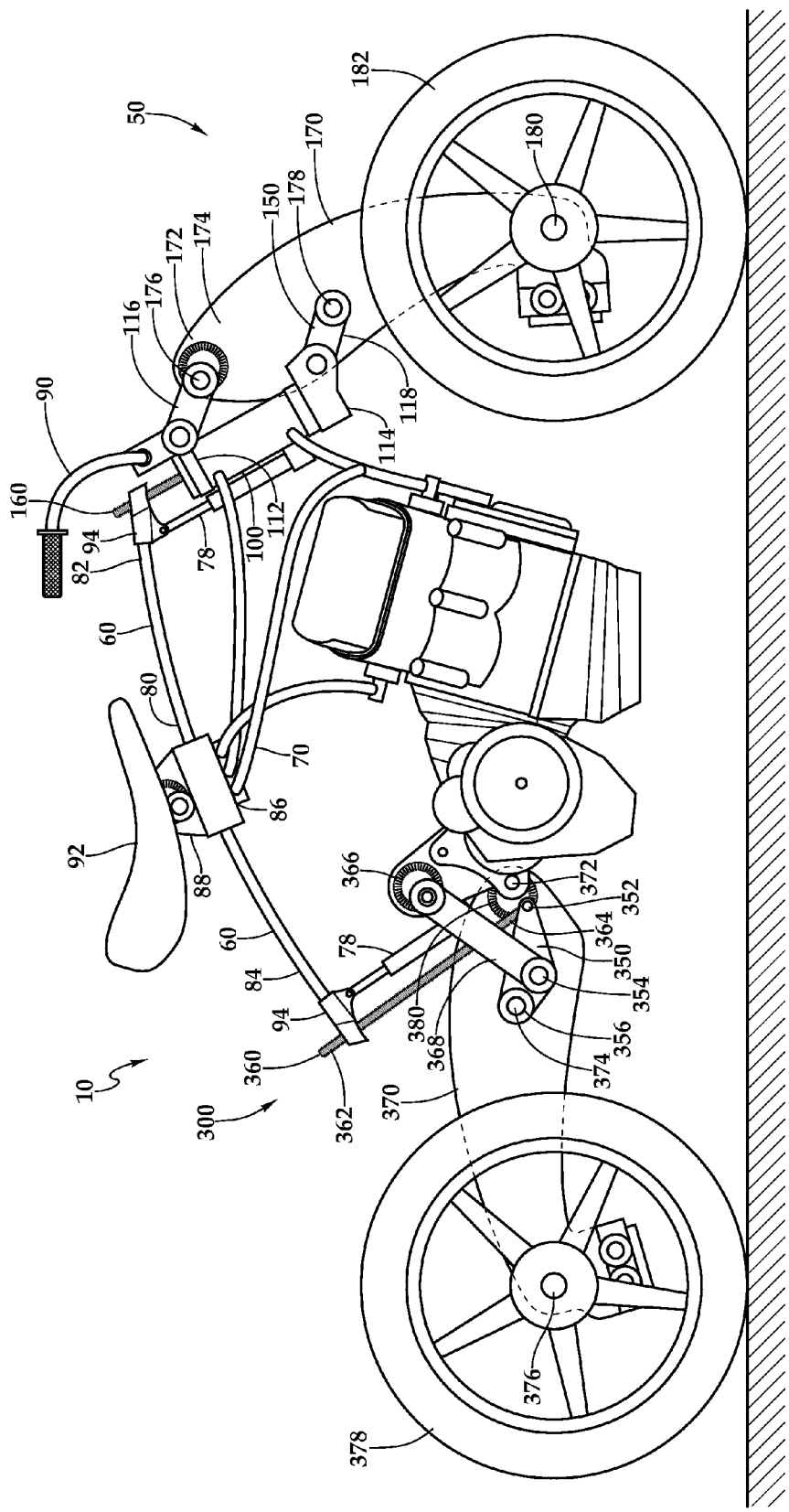
FIG. 1 is a side view of one embodiment of a suspension system having a front and rear suspension, showing the suspension in an initial position and having one front and one rear girder blade removed.
Figure 2:
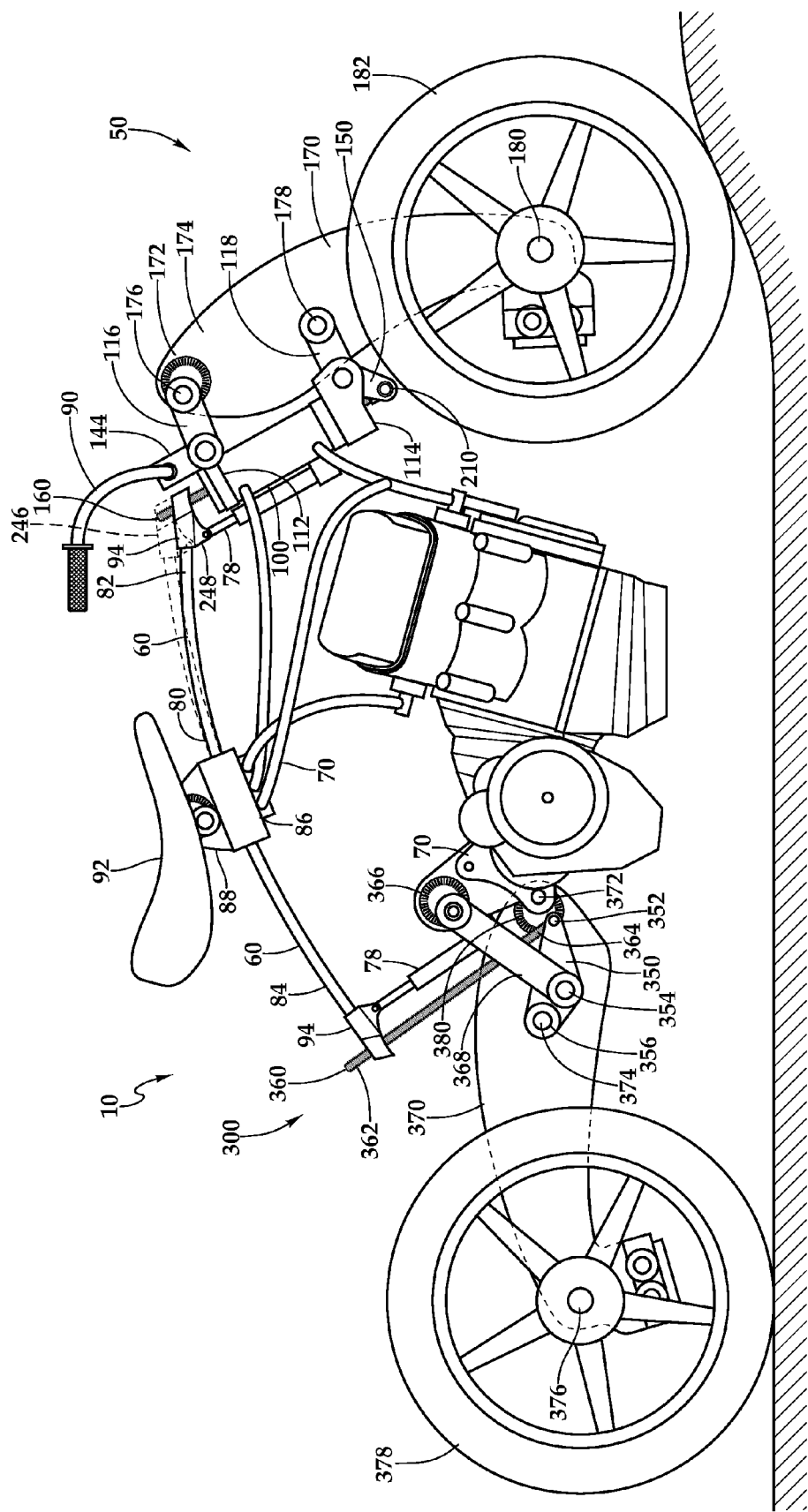
FIG. 2 is a side view of one embodiment of the suspension system showing a force on the front suspension and having one front and one rear girder blade removed.

Referring now to FIGS. 1-2, an embodiment of a motorcycle suspension system 10 may comprise a front suspension 50 and a rear suspension 300. Front suspension 50 includes spring 60, neck assembly 100, front linkage 150, front suspension rod 160, and two front girder blades 170. Rear suspension 300 includes spring 60, rear linkage 350, rear suspension rod 360, and two rear girder blades 370. While shown as a suspension system for a motorcycle, it is also contemplated that front suspension 50 and rear suspension 300 be used in a bicycle. One of the front girder blades 170 and one of the rear girder blades 370 are removed to enable viewing of all components of front and rear suspensions.

In general, front suspension 50 has spring 60 mounted to chassis 70 and connected to front linkage 150 of neck assembly 100 by front suspension rod 160 extending through a hollow steering stem 106 of neck assembly 100 and having a first end 162 coupled to spring 60 and second end 164 coupled to front linkage 150. Neck assembly 100 is mounted to chassis 70 and has hollow steering stem 106 that decouples steering and suspension. Spring 60 is statically mounted on the chassis 70 and remains stationary as handlebars 90, steering stem 106, and front girder blades 170 are rotated. Two front girder blades 170 are connected to neck assembly 100 by an upper control arm 116 and a lower control arm 118 at eccentric point 176 and middle point 178, respectively, with one girder blade 170 being connected on each side of neck assembly 100. Eccentric point 176 is in front girder eccentric assembly 172 that is located in upper portion 174 of front girder blades 170. Front girder blades 170 further couple to a front wheel axle 180 having a wheel 182 rotatably mounted thereon between front girder blades 170.

The girder blades 170 are the front forks of the motorcycle and are connected to chassis 70 by neck assembly 100. Front girder blades 170 extend downward towards front wheel 182 at an angle from front girder eccentric assembly 172 through middle point 178 to the connection with the front wheel axle 180. Each girder blade 170, 370 in the front and rear suspensions 50, 300 is substantially identical. The girder blades 170, 370 are preferably made from a reinforced fiberglass composite material, however, it is contemplated that the girder blades 170, 370 be made from any other durable, strong material, such as titanium, steel, or carbon composite.

Rear suspension 300 has spring 60 mounted to chassis 70 and connected to rear linkage 350 by rear suspension rod 360 having a first end 362 coupled to spring 60 and a second end 364 coupled to rear linkage 350 at first point 352. Ride height arm 368 further connects ride height adjustment eccentric 366 to a second point 354 of rear linkage, and a third point 356 of rear linkage 350 couples to middle point 374 on two rear girder blades 370 with one girder blade 370 being on each side of rear linkage 350. Rear girder blades 370 extend horizontally with respect to the ground coupling to chassis 70 at eccentric point 372 and to a rear axle 376 having a rear wheel 378 rotatably mounted thereon. Front and rear girder blades 170, 370 are bilaterally symmetrical. As such, the same girder blade can be used in front suspension 50 and in rear suspension 300.

In one embodiment, spring 60 is a spring member, i.e., a centrally located, single leaf spring 80 having front end 82 and rear end 84 that acts as the spring 60 for both front suspension 50 and rear suspension 300 of the motorcycle. Leaf spring 80 is preferably composed of reinforced fiberglass composite, however it is contemplated that leaf spring 80 be composed of other suitable material, such as steel, titanium, carbon composite, and that the leaf spring 80 be made from multiple leaf springs.

Leaf spring 80 is supported by a perch 86 that is connected to chassis 70. An eccentric seat mount 88 couples seat 92 to perch 86. Perch 86 and mount 88 isolates front end 82 and rear end 84 of the leaf spring 80 and prevents vibrations and force exerted on one end from being transferred through leaf spring 80 onto the opposite end.

Referring again to FIGS. 1-2 and 5, end piece 94 is coupled to both front end 82 and rear end 84 of leaf spring 80. Each end piece 94 is substantially identical and provides a point for coupling the leaf spring 80 to front and rear suspension rods 160, 360. End piece 94 has a hollow rectangular body portion 96 that slides onto and secures to the leaf spring 80 by inserting fasteners into openings in the body portion 96. It is also contemplated that end piece be secured by an adhesive. A hollow cylindrical portion 98 extends from the body portion 96 away from end 82 of the leaf spring 80. The cylindrical portion 98 is configured to receive first end 162 of front suspension rod 160 having a spherical bearing 166 fastened thereto, preventing first end 162 of front suspension rod 160 from being pulled through cylindrical opening 98, as shown in FIG. 5. Front suspension rod 160 extends from end piece 94 of leaf spring 80 through hollow steering stem 106 of neck assembly 100 and couples to front linkage 150 of lower control arm pivot bracket 114. Damper 78 may couple to outer shell 104 of neck assembly 100 and further to end piece 94.

Figure 4:
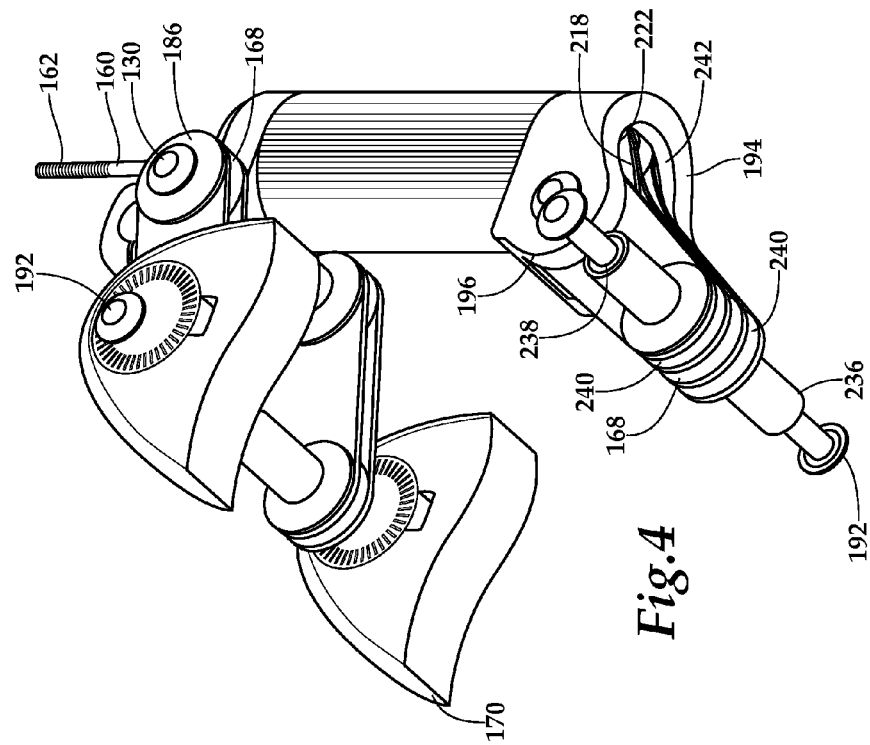
FIG. 4 is a perspective view from a bottom perspective of the steering neck with incorporated suspension components.
Figure 3:
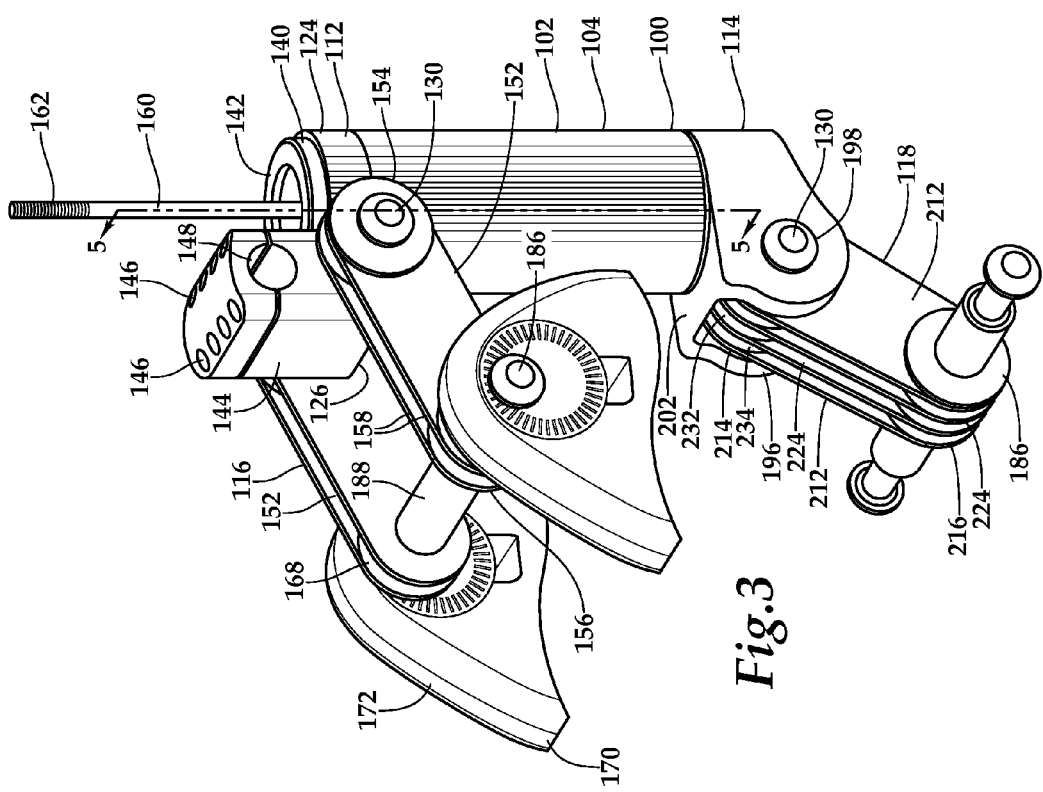
FIG. 3 is a perspective view of a steering neck with incorporated suspension components.

Referring now to FIGS. 3-5, neck assembly 100 may include neck piece 102, upper control arm pivot bracket 112, and lower control arm pivot bracket 114. Neck piece 102 includes outer shell 104 housing hollow steering stem 106. Hollow steering stem 106 is a generally a cylindrical member having threaded first end 108 and second end 110. Threaded first end 108 of steering stem 106 couples to upper control arm pivot bracket 112 and the threaded second end 110 couples to lower control arm pivot bracket 114. Outer shell 104 is a hollow cylindrical shell having a diameter larger than the steering stem 106 and encases the steering stem 106. Steering stem 106, upper control arm pivot bracket 112, and lower control arm pivot bracket 114 are rotatable with respect to outer shell 104.

Upper control arm pivot bracket 112 has a substantially flat top 122 with a semi-circular end 124 of a substantially similar diameter as the outer shell 104 and another end 126 that is generally rectangular shaped. The rectangular end 126 has a lateral opening 128 extending through upper control arm pivot bracket 112 configured to receive a shoulder bolt 130 on each end of opening 128, and a plurality of openings that are substantially normal to lateral opening 128 and configured to receive fasteners. Semi-circular end 124 of upper control arm pivot bracket 112 has cylindrical connecting piece 132 with a diameter slightly smaller than outer shell 104 extending beyond bottom surface 134 of the upper control arm pivot bracket 112 and has a threaded opening configured to couple with first end 108 of steering stem 106. Exterior surface 136 of the connecting piece 132 may have a groove configured to receive an O-ring. The O-ring provides a seal between outer shell 104 and steering stem 106 when outer shell 104 is inserted over connecting piece 132, preventing water or other contaminants from entering outer shell 104. Abutting connecting piece 132 is a taper roller bearing 138 located between outer shell 104 and steering stem 106. Retaining washer 140 and top nut 142 located on top of flat top 122 and fastened to threaded first end 108 of steering stem 106 secure upper control arm pivot bracket 112 to steering stem 106.

Handlebars 90 are secured to rectangular end 126 of upper control arm pivot bracket 112 by riser 144 that is coupled to upper control arm pivot bracket 112. Riser 144 is generally block shaped having a plurality of openings 146 to receive fasteners and a larger opening 148 extending laterally through riser 144 configured to receive the handlebars 90. Plurality of openings 146 in riser 144 are located along riser 144 at substantially identical locations as plurality of openings on the upper control arm pivot bracket 112.

Referring again to FIG. 3, upper control arm 116 pivotally couples to upper control arm pivot bracket 112 and includes two upper linkages 152 with one upper linkage 152 located on each side of rectangular end 126 of the upper control arm pivot bracket 112. Upper linkages 152 are generally parallel and extend outward in a direction away from outer shell 104 from first end 154 coupled to upper control arm pivot bracket 112 to second end 156. Each upper linkage 152 includes two upper link plates 158 separated by a center spacer 168 on a first end 154 and a second end 156. Upper link plates 158 are elongated members having semi-circular ends. Each end has a circular opening. Center spacer 168 is washer having an opening substantially identical to the openings on each upper link plate 158.

On the first end 154 of each upper linkage 152, a hollow cylindrical upper bearing carrier 184 having a threaded outer surface is inserted into the openings of upper link plates 158 and center spacer 168. Two bearings separated by a spacer are located inside the upper bearing carrier 184. The bearings and the spacer contain an opening configured to receive a shoulder bolt 130. Upper link plates 158 are secured together by fastening a suspension nut 186 having a washer-like shape and a threaded opening to each threaded end of the upper bearing carrier 184. A shoulder bolt 130 inserted through the openings in the bearings and spacer and into lateral opening 128 of upper control arm pivot bracket 112 pivotally couples first end 154 of each upper linkage 152 to upper control arm pivot bracket 112.

Continuing with FIG. 3, on second end 156 of each upper linkage 152, a generally cylindrical spreader bar 188 having threaded ends connects second end 156 of each linkage 152 together. Each base of cylindrical spreader bar 188 contains an opening 190 configured to receive an extended shoulder bolt 192. The threaded ends of the spreader bar 188 are inserted into and through the openings of upper link plates 158 and center spacer 168. Two suspension nuts 186 are fastened to each threaded end of spreader bar 188, with one suspension nut 186 being fastened on either side of each upper linkage 152. An extended shoulder bolt 192 inserted through the openings on upper link plates 158 and center spacer 168 and into opening 190 in spreader bar 192 couples front girder blade 170 to each side of spreader bar 188.

Shoulder bolt 130 has an elongated shaft extending from a head portion with the shaft having an unthreaded portion and a threaded end. Extended shoulder bolt 192 is generally the same as shoulder bolt 130 but has a longer unthreaded portion. The length of unthreaded portion of extended shoulder bolt 192 is generally the same as the thickness of girder blades 170.

Referring again to FIGS. 3-5, lower control arm pivot bracket 114 couples to second end 110 of hollow steering stem 106 and has a generally U-shaped bottom 194 with each end 196 of U-shape bottom 194 being semi-circular. Each semi-circular end 196 contains an opening 198 configured to receive a shoulder bolt 130. A substantially flat top 202 having a cylindrical connecting piece 204 substantially similar to connecting piece 132 of upper control arm pivot bracket 112 covers one side of U-shaped bottom 194. Interior surface 206 of connecting piece 204 is threaded and couples with threaded second end 110 of steering stem 106. A taper roller bearing 138 abuts connecting piece 204 and is located between outer shell 104 and steering stem 106. Outer shell 104 is inserted over connecting piece 204 of the lower control arm pivot bracket 114 and an O-ring positioned in a groove in exterior surface 208 of the connecting piece 204 prevents water or other contaminants from entering into the outer shell.

Front linkage 150 comprises lower control arm 118 and flange 210. Lower control arm 118 is pivotally connected to lower control arm pivot bracket 114. Lower control arm 118 includes two lower side link plates 212, two short link plates 218, and two lower center link plates 224. Lower side link plate 212 is an elongated member having two circular ends with a first end 214 being greater diameter in diameter than a second end 216. First end 214 contains a circular opening having small tabs extending into the opening and spaced equidistance around the opening. The opening in the first end 214 is configured to receive a bearing carrier 230. Second end 216 of lower side link plate 212 contains a circular opening.

Short link plate 218 is a member having two circular ends, with first end 220 being larger in diameter than second end 222. First end 220 contains an opening that is substantially identical to the opening in first end 214 of lower side link plate 212 and second end 222 contains an opening configured to receive a fastener.

Lower center link plate 224 has the same basic structure and opening configuration as lower side link plate 212 except lower center link plate 224 has a flange 210 extending from first end 226 of lower center link plate 224 that is substantially identical to second end 222 of short link plate 218.

Lower control arm 118 is pivotally coupled to lower control arm pivot bracket 114 by inserting the first end 226 of two lower center link plates 224 separated by a center linkage spacer 232 between semi-circular ends 196 of the lower control arm pivot bracket 114. Center linkage spacer 232 has an opening that is substantially identical to the opening in first end 226 of lower center link plates 224. One short link plate 218 is inserted flush against each lower center link plate 224, on a side opposite center linkage spacer 232. A side linkage spacer 234 followed by lower side linkage plate 212 is then inserted between short link plate 218 and semi-circular ends 196 respectively on each side. Side linkage spacer 134 has a thickness that is less than that of center linkage spacer 232. All of the spacers have an opening that is substantially identical to the openings in the first end of the link plates 212, 218, 224. The openings are aligned and a bearing carrier is inserted though the openings in the first end of the link plates 212, 218, 224 and the openings in the spacers 232, 234. A suspension needle bearing encases a washer bearing inside the bearing carrier 230. Two shoulder bolts 130 are inserted through the openings of the circular ends 196 of the U-shaped bottom 194 and into the washer bearing pivotally coupling lower control arm 118 to lower control arm pivot bracket 114.

Second ends 216, 228 of lower side link plates 212 and lower center link plates 224 extend outward from lower control arm pivot bracket 114 and are coupled together by lower spreader bar 236 that is inserted through the openings in the second ends 216, 228 of lower side and lower center link plates 212, 224. Lower spreader bar 236 is a cylindrical shaft member having an opening 238 configured to receive an extended shoulder bolt 192 in each base, and two threaded sections, with each threaded section located slightly outside of the portion where each lower side link plate 212 contacts lower spreader bar 236. Lower center link plates 224 are separated by center spacer 168 and lower side link plates 212 are separated from lower center link plates 224 by a side spacer 240, with both center spacer 168 and side spacers 240 inserted on lower spreader bar 236. Side spacer 240 has a thickness that is less than the thickness of center spacer 168. A suspension nut 186 is inserted onto lower spreader bar 236 on each side of lower control arm 118 and secures lower control arm 118 to lower spreader bar 236. An extended shoulder bolt 192 inserted through front girder blade 170 and into opening 238 on lower spreader bar 236 couples front girder blade 170 at middle point 178 to each side of lower spreader bar 236.

Flange 210 of lower center link plates 224 and short link plates 218 extend from shoulder bolt 130 securing first end 226 of lower center link plates 224 into cavity 242 formed by U-shaped bottom 194 of lower control arm pivot bracket 114. The openings in flange 210 of lower center link plates 224 and second end 222 of short link plates 218 are aligned and a fastener inserted through each opening and an opening of spherical rod end 244 inserted between lower center link plates 224 secures link plates 224 and rod end 244 together. Spherical rod end 244 couples to second end 164 of front suspension rod 160 that extends through hollow steering stem 106, first end 162 of front suspension rod 160 coupling to end piece 94 of leaf spring 80. Spherical bearing 166 is used to couple first end 162 of front suspension rod 160 to end piece 94.

Neck assembly 100 components are preferably made from titanium, however, it is also contemplated that the components be made from any other strong durable materials.

Referring again to FIGS. 1-5, front linkage 150 comprises lower control arm 118 coupled to front girder blades 170 and flange 210 coupled to front suspension rod 160. As shown in FIG. 2, if front girder blades 170 are forced upward with respect to the neck assembly 100, front linkage 150 will pivot about the connection point with the U-shaped bottom 194 pulling front suspension rod 160 downward towards front wheel 182, exerting force on leaf spring 80. Leaf spring 80 deflects from its initial position 246 to a secondary position 248, absorbing and dissipating force and then returning to its original position 246. Damper 78 connected to end piece 94 dissipates kinetic energy and dampens oscillations of the spring caused by force exerted on the leaf spring 80.

Front suspension rod 160 is concentric with the steering axis allowing leaf spring 80 to connect to front linkage 150 and act as a suspension system, while not requiring leaf spring 80 to be mounted adjacent to front girder blades 170. This configuration decouples the steering and the suspension of the motorcycle and allows the suspension to mount static with respect to any rotation from handlebars 90 and front girder blades 170.

Referring again to FIGS. 1-2, rear suspension 300 may comprise leaf spring 80 having an end piece 94 connected to first point 352 on rear linkage 350 by rear suspension rod 360. Rear linkage 350 is pivotally connected at second point 354 to ride height adjust eccentric 366 by ride height arm 368 and third point 356 of rear linkage 350 is pivotally coupled between two rear girder blades 370 at middle point 374 on rear girder blades 370 by a shaft member extending from one girder blade to the other. Rear girder blades 370 further couple to chassis 70 at eccentric point 372 and to rear wheel axle 376 having a wheel rotatably mounted thereon 378.

Rear suspension 300 functions very similar to front suspension 50 described above. When rear wheel 378 and rear girder blades 370 are forced upward with respect to the ground, third point 356 of rear linkage 350 moves upward because it is coupled to rear girder blades 370. Rear linkage 350 pivots about third point 356 and first and second points 352, 354 of rear linkage 350 move downward, pulling leaf spring 80 downward. Leaf spring 80 dissipates the force and the assembly returns to its neutral position.

Referring now to FIG. 6, an embodiment of front suspension system is shown including a coil spring 480 as the spring 460 in front suspension. The suspension system functions the same as the leaf spring suspension described in FIGS. 1-5. Coil spring 480 is connected to member or end piece 494. As described above, suspension rod 482 couples to end piece 494 at first end 484, extends through neck piece 488 and couples to front linkage 490 in cavity 492 of lower control arm pivot bracket 474, connecting coil spring 480 to front linkage 490. Upper and lower control arms 496, 498 couple with front girder blades 470. Damper 478 may be used in conjunction with coil spring 480 to dampen oscillations and dissipate kinetic energy of coil spring 480. When a force moves front girder blades 470 upward with respect to neck piece 488, front suspension rod 482 pulls down on end piece 494 and coil spring 480 compresses dissipating force.

Referring now to FIGS. 7-8, an eccentric assembly 500 may comprise housing 502, puck 504, and worm gear 506. Housing 502 contains an opening 508 configured to receive puck 504. Puck 504 may include inner half 510 and outer half 512 having a spur gear located therebetween. In one embodiment, puck 504 includes opening 514 having a suspension needle bearing 516 located therein. Suspension needle bearing 516 is washer-shaped having an opening configured to receive a shaft member. In other embodiments, it is contemplated that puck 504 have a plurality of openings. Worm gear 506 mates with spur gear in window 518 and has an end 520 having an allen key indentation 526 that extends into side 522 of housing 502 and is accessible through side opening 524. Using an allen key or allen wrench to rotate worm gear 506 adjusts the location of puck opening 514 from a first position 528 to a second position 530 with respect to housing 502.

Eccentric assemblies 500 are located in various components and at various locations of the motorcycle suspension 10 including in each of the four girder blades 170, 370, in seat mount 88, in ride height adjust eccentric 366, and on the headlight mount (not shown). As shown in FIGS. 1-2, upper portion 174 of front girder blades 170 contains front girder eccentric assembly 172 that couples front girder blades 170 to upper control arm 116. Adjusting the location of opening of puck changes the angle that front girder blades 170 extend to front wheel axle 180, changing the trail of the motorcycle. Eccentric assemblies 500 on rear girder blades 370 are located at substantially identical positions as on front girder blades 170. A shaft member extends between rear girder blade eccentric assembly 380 of each rear girder blade 370 and connects rear girder blades 370 to chassis 70. Adjusting the location of opening in puck adjusts the position of rear wheel axle 376 in the horizontal direction allowing the chain tension of the motorcycle to be adjusted. Over time, the chain of motorcycle stretches. Rear girder blade eccentric assembly 380 can be adjusted to ensure the same chain tension with a stretched chain as when the chain was new. Adjusting eccentric assembly 380 on rear girder blades 370 enables the same chain to be used for a longer period of time even if the chain experiences stretching due to repeated use.

Ride height adjustment eccentric 366 is part of chassis 70 and is connected to rear linkage 350 by ride height arm 368. Adjusting the location of opening on ride height adjustment eccentric 366 raises or lowers the distance between rear linkage 350 and leaf spring 80, with a corresponding increase or decrease of tension on the spring, thereby changing the ride height of the motorcycle.

Seat mount eccentric 88 couples to perch 86 and has seat 92 coupled to puck. Adjusting the location of opening of puck changes the height and angle of seat 92 and the horizontal distance between handlebars 90 and seat 92. Seat mount eccentric 88 allows for easy adjustment of seat 92 for different riders. Eccentric assembly 500 can also be used in a headlight mount to adjust the height and angle that a headlight projects.

Referring now to FIGS. 9-10, an embodiment of a suspension system 600 is shown for use in an automobile or other four-wheeled vehicle comprises spring 610, two neck assemblies 620, and axle 650. In one embodiment, spring 610 may be a spring member, i.e., a leaf spring 612 having two ends 614 and being mounted to body portion 652 of axle 650 by mount 660. A neck assembly 620 is mounted to each end 654 of axle 650 in a substantially identical orientation on each end. Leaf spring 612 may have an end piece 616 on each end 614 that is connected to linkage 630 of lower control arm pivot bracket 624 of neck assembly 620 by suspension rod 640. End piece 616 may further connect to damper 670 mounted on axle 650. Suspension rod 640 extends from end piece 616 on leaf spring 612 through neck piece 622 and couples to linkage 630 in the same way as previously described for the front suspension. Upper control arm 626 and lower control arm 628 pivotally couple to neck assembly 620 on a first end 632, 636 of each arm and couple to a wheel assembly (not shown) at a second end 634, 638 of each control arm 626, 628. The angle each arm 626, 628 extends from neck assembly 620 is fully adjustable. The camber angle of the wheels can be changed by adjusting the angles that upper and lower control arm 626, 628 connect with the wheel assembly.

Castor angle can be adjusted by tilting axle 650 from position one 662 where neck assemblies 620 at each end 654 of axle 650 are substantially normal with respect to the ground, to position two 664 where neck assemblies 620 are orientated at an angle other than the vertical angle of position one 662. Clamps 666 are used to tilt axle 650 and adjust the castor angle. In this assembly, clamping axle 650 to adjust the castor angle ensures a substantially equal castor angle for each wheel because neck assemblies 620 are mounted to axle 650 at a substantially identical orientation. In this embodiment, it is not necessary to adjust the castor angle for each wheel independently, because clamping axle 650 in a desired orientation changes the castor angle for both wheel assemblies concurrently.

Referring now to FIGS. 11-12, a trail value calculator tool 700 comprises measuring surface 702, carriers 704, laser pointer 706, laser pointer carrier 708, and modified hubs and wheels 710. In one embodiment, measuring surface 702 is on a top surface 712 of a steel I-beam 714. Carriers 704 having modified hubs 710 bolted thereto are slidably mounted to I-beam 714. Modified hub and wheel 710 for front wheel 722 has slit 716 cut in it, such that the measuring surface 702 can be seen through modified hub 710 when looking at measuring surface 702 from above hub 710.

Figure 13:
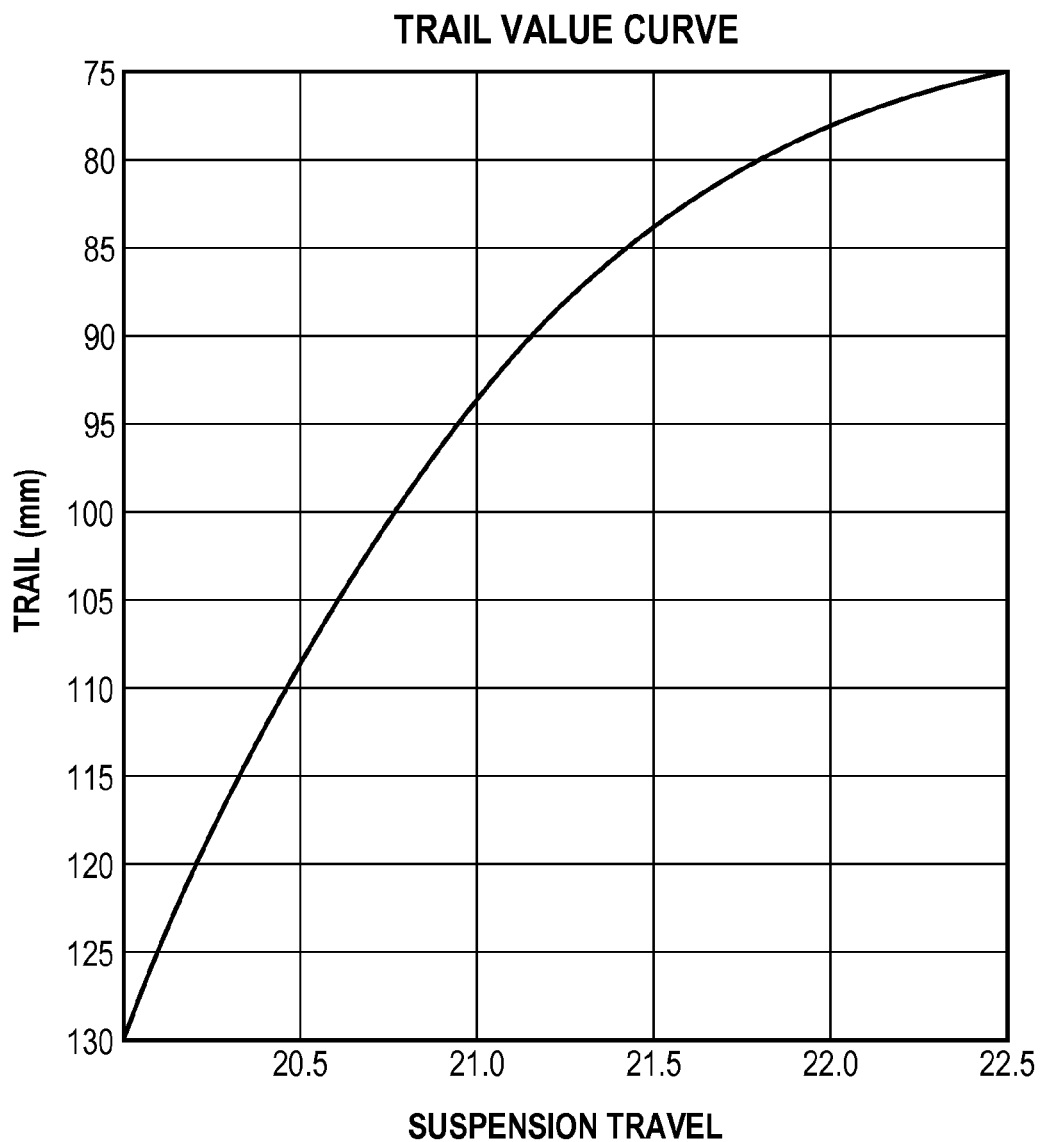
FIG. 13 is a graph of the trail value curve for one embodiment of the suspension system.

To plot trail value curve for the front suspension, as shown in FIG. 13, the front and rear wheels of a motorcycle are removed and motorcycle 718 is mounted to modified hubs and wheels 710 on carriers 704. Modified hubs 710 position chassis 720 at the exact height D1 that it would be with the normal wheels of motorcycle 718 properly inflated, accounting for the weight of motorcycle 718. The rear carrier is fixed to the I-beam 714 while front wheel 722 is allowed to slide along the length of the beam 714. Laser pointer 706 is inserted into laser pointer carrier 708 affixed in neck assembly 724 positioning the laser pointer 706 concentric with hollow steering stem 726 of neck assembly 724. The trail of motorcycle 718 is first calculated for motorcycle 718 in static position with no chassis 720 displacement D1 by taking the difference between the point where laser pointer 706 hits measuring surface 702 and the point where modified hub 710 rests on measuring surface 702. Next, lift 728 is used to displace chassis 720 to a second position D2, and a new trail value is calculated. This process is completed multiple times each for a different amount of simulated suspension travel until enough data is collected to plot trail value curve.

Trail value curve for a multi-link suspension shows the different trail values for one embodiment of a motorcycle that is braking. Braking or front end dive is simulated by displacing the chassis 720 of motorcycle 718. As motorcycle 718 begins to compress the front suspension and chassis 720 is displaced by a small amount, the trail initially decreases at a rapid, generally linear rate with respect to the amount of chassis displacement, as shown in FIG. 13. As motorcycle 718 continues to compress the front suspension and chassis 720 is displaced by a larger amount, the trail value begins to level off and does not decrease at the same linear relationship with respect to the amount chassis displacement. The leveling off of the trail is desirable because having a trail that is close to zero or negative may cause instability issues and wheel oscillation.

Trail value calculator tool 700 may be used to calculate the trail value for any motorcycle under any suspension or chassis conditions, including motorcycles with suspensions other than the multi-link suspension shown in FIGS. 11-12. It can be used when building motorcycles to calculate the trail of the motorcycle under simulated conditions before the motorcycle is ridden. Adjustments to the suspension including the length and dimensions of suspension links and the position of components can be made, and the trail value calculated before the motorcycle design is finalized. This may prevent the need for significant redesign of a motorcycle after an initial prototype has been built, because a user can calculate the trail value under different suspension and chassis conditions before ever riding the motorcycle.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A vehicle suspension system, comprising:
   a spring;
   a neck assembly having an outer shell housing a hollow stem, wherein said stem has an upper end and a lower end and is rotatable with respect to said outer shell, said upper end coupled to an upper bracket having a control arm pivotally coupled thereto, and said lower end coupled to a lower bracket having a linkage pivotally connected thereto;

a rod having a first end coupled to said spring and a second end coupled to said linkage, wherein said rod extends through said hollow stem;

wherein said linkage is further coupled to a wheel assembly.

2. A vehicle suspension system of claim 1, wherein said spring is a leaf spring.

3. A vehicle suspension system of claim 2, further comprising:

a rear linkage having a first connection point, a second connection point, and a third connection point, wherein said third connection point is pivotally coupled to a rear wheel assembly;

a second rod having a top end and a bottom end, wherein said top end is coupled to said leaf spring and said bottom end is coupled to said first point;

a ride height adjust eccentric connected to said second point by a ride height arm.

4. A vehicle suspension system of claim 2, further comprising:

an axle having a first end, a second end, and a body portion therebetween;

a second neck assembly having a hollow stem and second linkage;

wherein said neck assembly is coupled to said first end and said second neck assembly is coupled to said second end, and a mount connects said leaf spring to said body portion;

a second rod having a first and a second end, said first end of said second rod is coupled to said leaf spring and said second end of said second rod is coupled to said second linkage, wherein said second rod extends through said hollow stem of said second neck assembly.

5. A vehicle suspension system of claim 1, wherein said spring is a coil spring.

6. A vehicle suspension system of claim 1, further comprising an end piece coupled to said spring, wherein said first end of said rod couples to said end piece.

7. A vehicle suspension system of claim 1, further comprising a riser having a set of handlebars, said riser coupled to an upper surface of said upper bracket.

8. A vehicle suspension system of claim 1, wherein said wheel assembly comprises two girder blades coupled to an axle having a wheel rotatably mounted therebetween.

9. A vehicle suspension system of claim 8, said girder blades being reinforced fiberglass composite material.

10. A vehicle suspension system of claim 8, said girder blades having an eccentric assembly coupled to said control arm and a middle point coupled to said linkage.

11. A vehicle suspension system of claim 1, further comprising a damper mounted on said neck assembly, said damper connected to said spring.

12. An apparatus for a suspension system, comprising:

a hollow shell;

a hollow stem having an upper end and a lower end, wherein said shell houses said stem and said upper end is coupled to an upper bracket and said lower end is coupled to a lower bracket, wherein said stem, said upper bracket, and said lower bracket are rotatable with respect to said shell;

an upper control arm having a first end and a second end, said first end pivotally connected to said upper bracket and said second end pivotally connected to a first front fork member and a second front fork member;

a linkage having a lower control arm and a flange, said linkage pivotally connected to said lower bracket, said lower control arm pivotally connected to said first front fork member and said second front fork member, and said flange coupled to a rod that extends through said hollow stem and couples to a member.

13. An apparatus of claim 12, wherein said member is a leaf spring.

14. An apparatus of claim 12, further comprising a coil spring, wherein said coil spring is coupled to said member.

15. An apparatus of claim 12, wherein said upper control arm comprises two upper linkages with one upper linkage being pivotally attached on each side of said upper bracket.

16. An apparatus of claim 12, wherein said upper bracket is configured for attaching a pair of handlebars.

17. An apparatus of claim 12, further comprising a taper roller bearing between said shell and said stem.

* * * * *